US010076928B2

(12) United States Patent
Lee et al.

(10) Patent No.: US 10,076,928 B2
(45) Date of Patent: Sep. 18, 2018

(54) INTERIOR FILM HAVING TRANSVERSE HAIRLINES FORMED THEREIN AND A METHOD FOR MANUFACTURING THE INTERIOR FILM

(71) Applicant: LG HAUSYS, LTD., Seoul (KR)

(72) Inventors: Min Ho Lee, Busan (KR); Eun Cheol Ha, Busan (KR); Doo Yong Jung, Busan (KR); Jae Gwang Nam, Busan (KR)

(73) Assignee: LG Hausys, Ltd., Seoul (KR)

( * ) Notice: Subject to any disclaimer, the term of this patent is extended or adjusted under 35 U.S.C. 154(b) by 610 days.

(21) Appl. No.: 14/414,041

(22) PCT Filed: Jul. 12, 2013

(86) PCT No.: PCT/KR2013/006285
§ 371 (c)(1),
(2) Date: Jan. 9, 2015

(87) PCT Pub. No.: WO2014/011002
PCT Pub. Date: Jan. 16, 2014

(65) Prior Publication Data
US 2015/0174949 A1    Jun. 25, 2015

(30) Foreign Application Priority Data
Jul. 12, 2012 (KR) .................... 10-2012-0075934

(51) Int. Cl.
*B44F 1/04*    (2006.01)
*B32B 27/36*    (2006.01)
(Continued)

(52) U.S. Cl.
CPC ............... *B44F 1/045* (2013.01); *B32B 7/12* (2013.01); *B32B 27/08* (2013.01); *B32B 27/18* (2013.01);
(Continued)

(58) Field of Classification Search
CPC . B44F 1/045; B32B 7/12; B32B 27/40; B32B 27/38; B32B 27/365; B32B 27/42;
(Continued)

(56) References Cited

U.S. PATENT DOCUMENTS

2008/0009412 A1*  1/2008  Funada ............... B42D 25/328
                                                          503/200
2009/0004478 A1*  1/2009  Baetzold ............ C08G 18/672
                                                          428/412
2011/0274881 A1*  11/2011 Konda ................... B05D 5/00
                                                          428/161

FOREIGN PATENT DOCUMENTS

JP       2006255894 A  *  9/2006  ............ B32B 33/00
KR    1020050011832         1/2005
(Continued)

Primary Examiner — Nathan L Van Sell
(74) Attorney, Agent, or Firm — Dentons US LLP

(57) ABSTRACT

The present invention provides an interior film having a transverse hairline implemented therein and, more specifically, provides an interior film (F) having a transverse hairline implemented therein, comprising: a transparent plastic film layer (30); an UV imprinting layer (50) which has a transverse hairline implemented therein and is formed below the transparent plastic film layer (30); and a metal deposition layer (70) formed below the UV imprinting layer.

28 Claims, 5 Drawing Sheets

(51) Int. Cl.
*B32B 7/12* (2006.01)
*B32B 27/18* (2006.01)
*B32B 27/30* (2006.01)
*B32B 27/32* (2006.01)
*B32B 27/42* (2006.01)
*B32B 27/40* (2006.01)
*B32B 27/38* (2006.01)
*B32B 27/08* (2006.01)
*B32B 38/00* (2006.01)
*B32B 37/24* (2006.01)
*B32B 37/12* (2006.01)

(52) U.S. Cl.
CPC ............ *B32B 27/30* (2013.01); *B32B 27/304* (2013.01); *B32B 27/32* (2013.01); *B32B 27/36* (2013.01); *B32B 27/365* (2013.01); *B32B 27/38* (2013.01); *B32B 27/40* (2013.01); *B32B 27/42* (2013.01); *B32B 37/1207* (2013.01); *B32B 37/24* (2013.01); *B32B 38/0008* (2013.01); *B32B 38/0012* (2013.01); *B32B 2037/1215* (2013.01); *B32B 2037/243* (2013.01); *B32B 2038/0076* (2013.01); *B32B 2255/10* (2013.01); *B32B 2255/205* (2013.01); *B32B 2255/26* (2013.01); *B32B 2255/28* (2013.01); *B32B 2307/402* (2013.01); *B32B 2307/408* (2013.01); *B32B 2307/409* (2013.01); *B32B 2307/412* (2013.01); *B32B 2307/416* (2013.01); *B32B 2307/712* (2013.01); *B32B 2307/75* (2013.01); *B32B 2367/00* (2013.01); *B32B 2451/00* (2013.01); *B32B 2509/10* (2013.01); *Y10T 156/1039* (2015.01); *Y10T 428/24364* (2015.01)

(58) Field of Classification Search
CPC ....... B32B 27/32; B32B 27/304; B32B 27/30; B32B 27/18; B32B 27/36; B32B 27/08; B32B 38/0012; B32B 38/0008; B32B 37/24; B32B 37/1207; B32B 2509/10; B32B 2255/10; B32B 2307/402; B32B 2307/712; B32B 2307/75; B32B 2451/00; B32B 2255/28; B32B 2367/00; B32B 2307/409; B32B 2307/412; B32B 2307/416; B32B 2037/1215; B32B 2038/0076; B32B 2255/205; B32B 2255/26; B32B 2307/408; Y10T 428/24364; Y10T 156/1039
See application file for complete search history.

(56) References Cited

FOREIGN PATENT DOCUMENTS

| KR | 1020090108790 | 10/2009 | |
|---|---|---|---|
| KR | 20100048109 A * | 5/2010 | ............... B32B 3/30 |
| KR | 1020100048109 | 5/2010 | |
| KR | 1020110069462 | 6/2011 | |
| KR | 1020110136437 | 12/2011 | |
| WO | WO 2010036015 A3 * | 6/2010 | ........... C23C 14/205 |

* cited by examiner

INTERIOR FILM HAVING TRANSVERSE HAIRLINES FORMED THEREIN AND A METHOD FOR MANUFACTURING THE INTERIOR FILM

This application is a 35 USC § 371 National Stage entry of International Application No. PCT/KR2013/006285, filed on Jul. 12, 2013, which claims priority from Korean Patent Application No. 10-2012-0075934, filed on Jul. 12, 2012, in the Korean Intellectual Property Office, all of which are incorporated herein by reference in their entirety.

TECHNICAL FIELD

The present invention relates to an interior film having transverse hairlines formed therein and a method for manufacturing the interior film, and more particularly, to an interior film having transverse hairlines which includes an UV imprinting layer having fine transverse hairlines which were not expressed in the conventional interior film of a metallic texture so as to draw an outer appearance very similar with the hairlines formed in the surface of a metallic material, and a method for manufacturing the interior film.

BACKGROUND ART

In a case that metallic materials, such as aluminum, copper, stainless steel, and so on, are used as household appliances like washing machines and refrigerators and interior and exterior materials of construction structures like elevator interior finishing materials, the metallic materials are widely used because they make a cool and classy feeling.

Especially, when a worker forms hairlines in the surface of the metallic material one by one using sandpaper or non-woven fabric, scratches are barely recognized even though the scratches are formed because gloss peculiar to metal and the hairlines make appearance beautiful due to diffused reflection of light by fine curves of the hairlines, and hence, metallic materials in which hairlines are formed are widely used to household appliances and interior and exterior materials of construction structures.

However, because the metallic materials are expensive and heavy and have a problem of properties such as erosion event, attempts to make interior films, which have an effect similar to the metallic materials, of plastic materials, which have good processability and are relatively inexpensive, instead of the metallic materials have been continuously made.

Conventionally, in order to manufacture an interior film which has the texture of a metallic material in which hairlines are formed, a synthetic resin panel (film) (KR 10-2003-0087100 A) is manufactured through the steps of carrying out screen printing with transparent ink to form a hairline pattern in a transparent plastic film, mainly, a PET film, and forming a metal vapor deposition layer on the printed surface, or an interior film is manufactured through the steps of directly forming hairlines in a transparent plastic film using sandpaper, forming a metal vapor deposition layer on the film in which the hairline pattern is formed, forming an adhesive layer on the metal vapor deposition layer and laminating the metal vapor deposition layer with a base film.

However, in the case that the interior film having the metal texture in which the hairlines are formed by the method of carrying out screen printing using the transparent ink is manufactured, because the interior film is worse in three-dimensional effect and texture of metallic materials than the case of directly forming the hairlines in the transparent plastic film and carrying out metal vapor deposition, most of interior films are manufactured by a method of carrying out metal vapor deposition after directly forming the hairlines in the transparent plastic film.

In the meantime, in the case of forming the hairline in the transparent plastic film itself, the transparent plastic film passes through a roller on which sandpaper is wound, and then, the hairline is formed by a physical scratch on the transparent plastic surface. The film manufactured by such a method has several disadvantages in that it is unsuitable as a surface material for household appliances because it is easily damaged and in that the surface of the film must be washed with air or water due to fine dust generated while the surface of the film is scratched. Furthermore, above all, in the case that the hairlines are directly formed in the transparent plastic film, hairlines are formed in the length direction and in the parallel direction, namely, longitudinal hairlines formed in the direction that the film is wound on the roll, but it is impossible to form the hairlines perpendicular to the length direction of the film, namely, transverse hairlines formed in the width direction of the film. Additionally, because the conventional longitudinal hairlines are uniformly long hairlines, it is impossible to form hairlines of various lengths.

Therefore, various attempts to manufacture a film having the texture of the metallic material which has hairlines formed in the surface thereof has been made continuously, but they have an advantage in that they are lower in texture than the real metallic materials.

DISCLOSURE

Technical Problem

Accordingly, the present invention has been made in an effort to solve the above-mentioned problems occurring in the prior arts, and it is an object of the present invention to provide an interior film which has transverse hairlines of various lengths and roughness formed perpendicularly to the length direction of the film, and a method for manufacturing the interior film.

Technical Solution

To achieve the above objects, the present invention provides an interior film having transverse hairlines including: a transparent plastic film layer; an UV imprinting layer which has transverse hairlines formed therein and is formed below the transparent plastic film layer; and a metal deposition layer formed below the UV imprinting layer.

Moreover, in another aspect of the present invention, the present invention provides a method for manufacturing an interior film having transverse hairlines formed therein comprising the steps of: applying an ultraviolet-curable resin composition to one side of a transparent plastic film layer; imprinting a ultraviolet-curable resin composition applied to the transparent plastic film layer with a forming roller in which transverse hairlines are formed, and curing the ultraviolet-curable resin composition with ultraviolet rays to form an UV imprinting layer having the transverse hairlines formed therein; and forming a metal deposition layer below the UV imprinting layer.

Advantageous Effects

As described above, the interior film does not have hairlines which are directly formed in the transparent plastic film layer but includes the UV imprinting layer having the transverse hairlines formed therein through the steps of imprinting the ultraviolet-curable resin composition applied onto the transparent plastic film layer with the mold roller on which the transverse hairlines are formed and curing the ultraviolet-curable resin composition with ultraviolet rays, thereby expressing the transverse hairlines which were not expressed in the conventional interior film without any damage of the transparent plastic film layer.

In addition, the interior film having the transverse hairlines formed therein according to the present invention has no damage of the transparent plastic film layer and solves the problem to wash the surface of the film with air or water due fine dust generated while the surface of the film is scratched because the hairlines are not directly formed in the transparent plastic film.

Moreover, the interior film having the transverse hairlines formed therein according to the present invention includes the UV imprinting layer formed by using the forming roller on which the transverse hairlines having various lengths and roughness are formed, thereby drawing the outer appearance that is the closest to the hairlines formed in the surface of the real metallic material but that could not be expressed by any of the conventional interior films.

MODE FOR INVENTION

Hereinafter, reference will be now made in detail to an interior film having transverse hairlines formed therein and a method for manufacturing the interior film according to preferred embodiments of the present invention with reference to the attached drawings.

Figure 1:
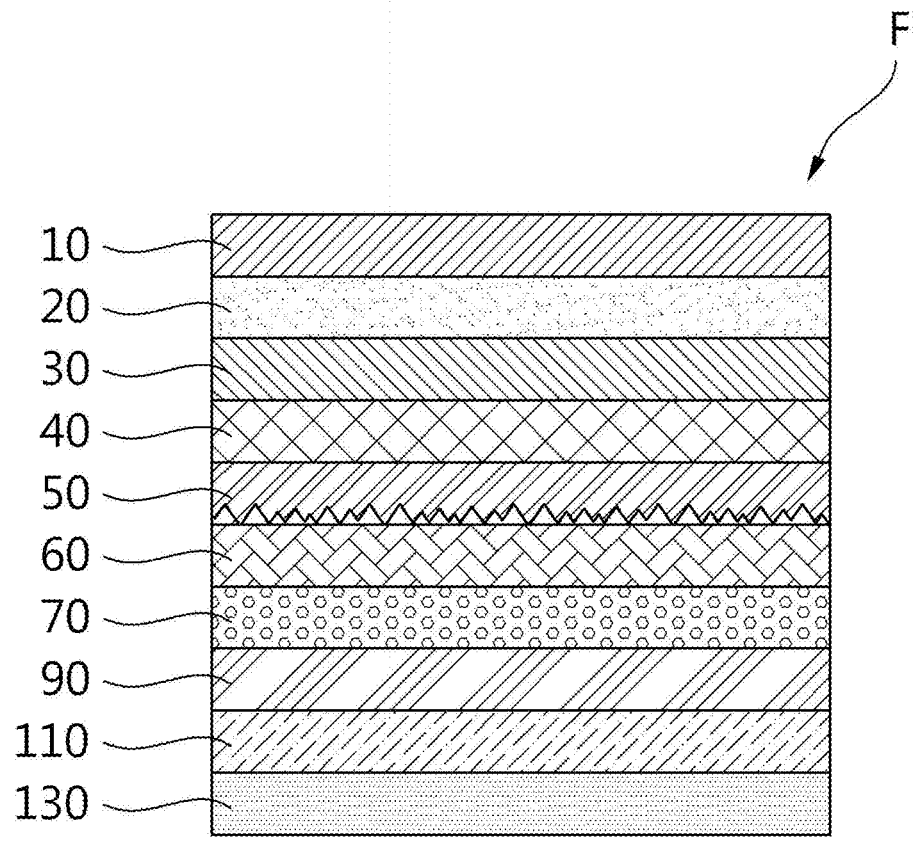
FIG. 1 is a view showing an interior film (F) having transverse hairlines formed therein according to a first preferred embodiment of the present invention.

The interior film F having transverse hairlines formed therein according to the present invention includes: a transparent plastic film layer 30; an UV imprinting layer 50 which has transverse hairlines formed therein and is formed below the transparent plastic film layer 30; and a metal deposition layer 70 formed below the UV imprinting layer (See FIG. 1).

Moreover, the interior film F having the transverse hairlines formed therein is manufactured through a manufacturing method including the steps of: applying an ultraviolet-curable resin composition to one side of a transparent plastic film layer 30; imprinting the ultraviolet-curable resin composition applied to the transparent plastic film layer 30 with a forming roller R in which transverse hairlines are formed and curing the ultraviolet-curable resin composition with ultraviolet rays to form an UV imprinting layer 50 having the transverse hairlines formed therein; and forming a metal deposition layer 70 below the UV imprinting layer 50.

In the method for manufacturing the interior film F having the transverse hairlines formed therein, upper and lower sides are divided based on finally finished products. For instance, the expression, "a metal deposition layer 70 formed below the UV imprinting layer", is made because the metal deposition layer 70 is formed below the UV imprinting layer 50 based on the finished film. Therefore, it is obvious to those skilled in the art that the metal deposition layer may be formed above the UV imprinting layer 50 in a state where the film is inverted according to a worker's convenience.

The transparent plastic film layer 30 may be one selected from a polyethylene terephthalate (PET) film, a polybutylene terephthalate (PBT) film, a polypropylene (PP) film, a polyethylene (PE) film, a poly vinyl chloride (PVC) film, a poly methyl methacrylate (PMMA) film, an acrylonitrile-butadiene-styrene (ABS) film, a polycarbonate (PC) film and a styrene-acrylonitrile copolymer (SAN) film. Preferably, to use a transparent PET film which is thin and has good uniformity and transparency makes the transverse hairlines formed in the UV imprinting layer 50 and metallic texture of the metal deposition layer 70 formed below the UV imprinting layer 50 more clear.

Moreover, the transparent plastic film layer 30 is 20 to 200 μm in thickness. If the transparent plastic film layer 30 is less than 20 μm in thickness, it cannot support the UV imprinting layer 50 which is formed below the transparent plastic film layer 30 and may break the form of the UV imprinting layer 50. If the transparent plastic film layer is over 200 μm in thickness, the outer appearance of the metal deposition layer 70 formed below the UV imprinting layer 50 may not be seen well from the upper part of the transparent plastic film layer 30. Therefore, it is preferable that the transparent plastic film layer 30 have the thickness within the above-mentioned range. More preferably, the transparent plastic film layer 30 is 20 to 50 μm in thickness.

The interior film F having the transverse hairlines formed therein according to the present invention includes the UV imprinting layer 50 which is formed below the transparent plastic film layer 30 and has the transverse hairlines formed therein.

The UV imprinting layer 50 is formed through the steps of imprinting the ultraviolet-curable resin composition applied to the transparent plastic film layer 30 with a forming roller R in which transverse hairlines are formed and curing the ultraviolet-curable resin composition with ultraviolet rays so that the transverse hairlines formed in the forming roller R are expressed on the transparent plastic film layer 30 to which the ultraviolet-curable resin composition is applied.

Figure 4:
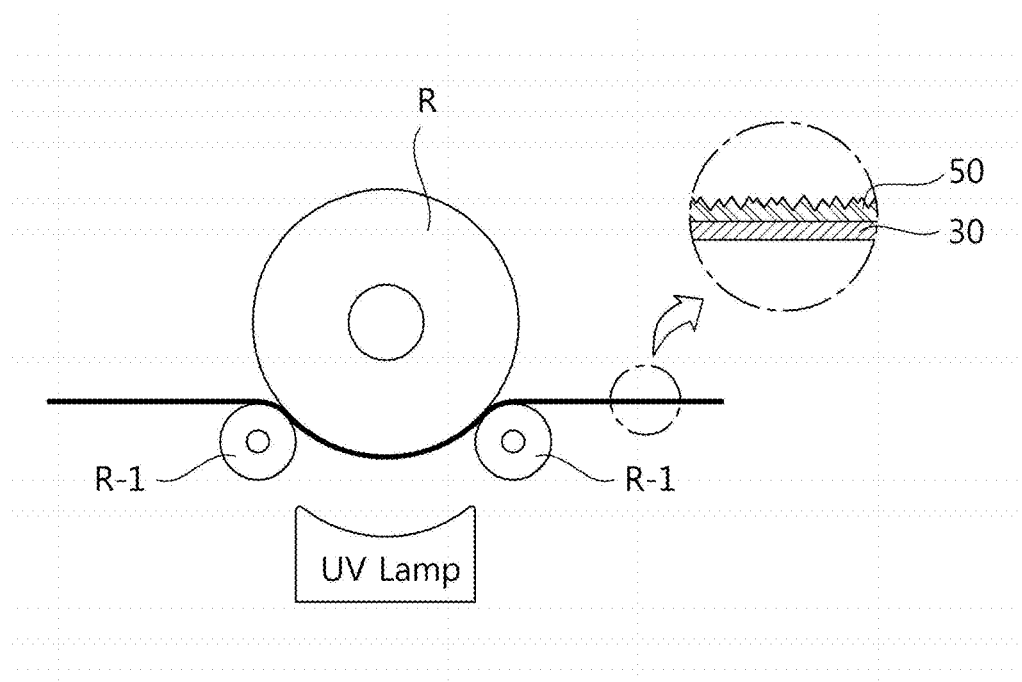
FIG. 4 is a schematic diagram showing the steps of imprinting the ultraviolet-curable resin composition applied onto a transparent plastic film layer (30) with a forming roller on which transverse hairlines are formed and curing the ultraviolet-curable resin composition with ultraviolet rays to form an UV imprinting layer 50 having the transverse hairlines formed therein, out of a manufacturing process of the interior film F having the transverse hairlines formed therein according to the present invention.
Figure 5:
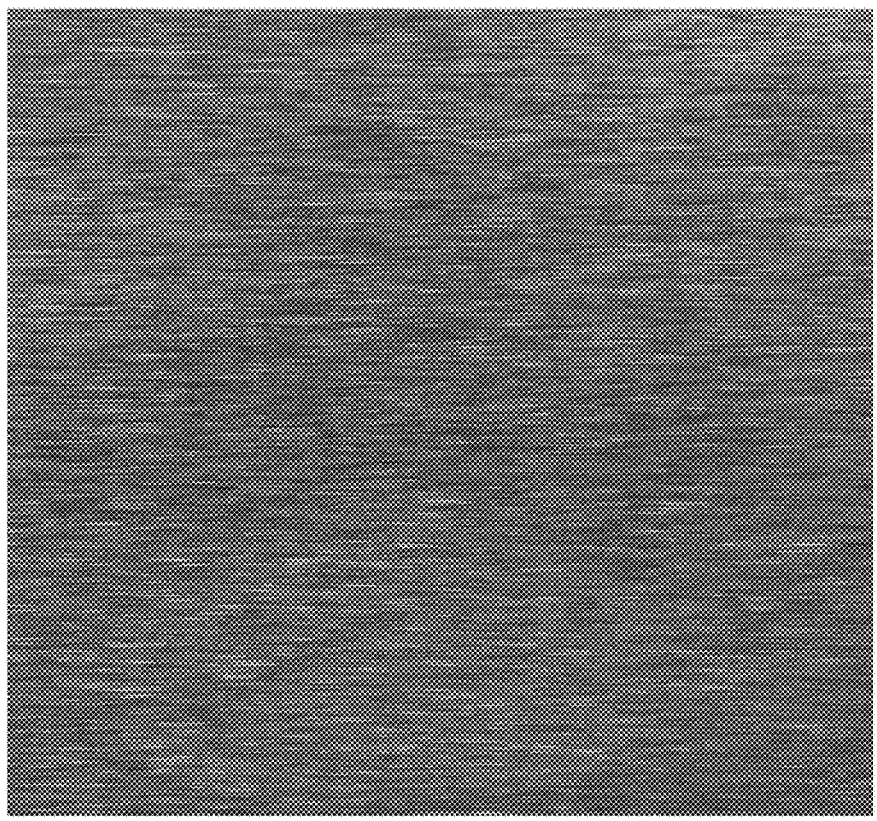
FIG. 5 is a photograph of the interior film having the transverse hairlines formed therein according to the present invention.

In more detail, the transparent plastic film layer 30 to which the ultraviolet-curable resin composition is applied passes between the forming roller R and a steel roller R-1, and ultraviolet rays are irradiated. Then, the transverse hairlines formed in the forming roller R are imprinted and hardened on the ultraviolet-curable resin composition as they are, such that the UV imprinting layer 50 having the transverse hairlines formed therein is formed (See FIG. 4).

The ultraviolet-curable resin composition contains acrylate oligomers, monomers, photoinitiators, and other additives for supplementing material properties.

The acrylate oligomer may be one selected from urethane groups, epoxy groups, ester groups, ether groups and silicon groups, and preferably, polyurethane acrylate produced by reacting diisocyanate, polyol and methacrylate.

The photoinitiator is generally a photoinitiator such as Irgacure 184 and may be used in combination with photostabilizer such as Tinuvin 400.

The ultraviolet-curable resin composition may be resin composition having 30 to 100 weight % of solid, and preferably, resin composition having 100 wt % of solid to which a solvent is not added in order to form the same hairlines as the transverse hairlines formed in parallel with right and left length directions of the forming roller.

It is preferable that the cured UV imprinting layer of the ultraviolet-curable resin composition be 2 to 80 μm in thickness. If the cured UV imprinting layer is less than 2 μm in thickness, it is difficult to form the transverse hairlines, but if the cured UV imprinting layer is more than 80 μm in thickness, cracks are generated due to high hardness. Therefore, it is preferable that the UV imprinting layer be formed within the above-mentioned range.

Preferably, the transverse hairline formed in the UV imprinting layer 50 is 0.1 to 100 mm in length, 0.1 to 10 μm in average roughness (Ra) and 20 to 350 per unit length of 1 cm in the number of lines, and more preferably, 0.1 to 10 mm in length, 0.2 to 0.7 μm in average roughness (Ra) and 80 to 140 per unit length of 1 cm in the number of lines. If length of the transverse hairline is less than 0.1 mm or more than 100 mm, it is difficult to form the same texture as the hairline of the surface of the metallic material, and hence, it is preferable that the hairline is formed within the above-mentioned range. More preferably, when the hairline is 0.1 to 10 mm in length, the hairline is the most natural and provides a beautiful outer appearance. In the meantime, it is difficult to provide a classy feeling and the texture of real SUS is not expressed if the hairline is too long. Therefore, it is preferable that the maximum value of the length of the hairline do not exceed 100 mm.

If the average roughness is less than 0.1 μm, it is difficult to provide the beautiful outer appearance due to diffused reflection of light. If the average roughness is more than 10 μm, it provides a rough feeling and thus it is difficult to express the same feeling as the hairline of the surface of the metallic material which is smooth and natural. Therefore, it is preferable that the average roughness be within the above-mentioned range. More preferably, when the average roughness is 0.2 to 07 μm, the hairline is the most natural and smooth and provides the beautiful outer appearance.

Moreover, the number of lines per unit length of 1 cm is the number of transverse hairlines passing lines of 1 cm in length which is parallel to the length direction of the interior film. If the number of lines is less than 20, the hairlines are deteriorated in beauty of the outer appearance due to diffused reflection of light. If the number of lines is more than 350, it is possible to diminish outer appearance due to too many lines, and hence, i is preferable that the number of lines is within the above-mentioned range. More preferably, the hairlines are the most natural and beautiful in outer appearance when the hairlines are 80 to 140 per unit length of 1 cm in the number of lines.

The transverse hairlines have various lengths and roughness within the ranges of the length of 0.1 to 100 mm and the roughness (Ra) of 0.1 to 10 μm. Therefore, the interior film having the transverse hairlines formed therein according to the present invention can draw the outer appearance that is the closest to the hairlines formed in the surface of the real metallic material but that could not be expressed by any of the conventional interior films.

The interior film F having the transverse hairlines formed therein according to the present invention includes the metal deposition layer 70 formed below the UV imprinting layer 50.

The metal deposition layer 70 is formed below the UV imprinting layer 50 by deposition of one selected from aluminum, chrome, zinc, copper, stainless steel, gold, silver, nickel, cobalt, iron, tin and sten.

The metal deposition layer 70 may be generally formed by vacuum evaporation or sputtering. For instance, the vacuum evaporation may be carried out within the ranges of $10^{-4}$ to $10^{-6}$ torr and 300 to 800° C. In case of the sputtering, plasma is divided into small metal nanoparticles, and then, metal deposition can be carried out, such that the metal nanoparticles are coated at the lower end of the UV imprinting layer 50, but the deposition method is not specially restricted. The metal is one selected from aluminum, chrome, zinc, copper, stainless steel, gold, silver, nickel, cobalt, iron, tin and sten, and preferably, aluminum, but the present invention is not restricted to the above. Those skilled in the art can select proper metal according to textures of the metals to form the metal deposition layer 70.

Preferably, the metal deposition layer 70 is 100 to 1,000 Å in thickness. If the thickness of the metal deposition layer 70 is less than 100 Å, it is difficult to sense the feeling of metallicity from the outside of the transparent plastic film layer 30. If the thickness of the metal deposition layer 70 is more than 1,000 Å, cracks may be generated and adhesion may be deteriorated, and the manufacturing costs are increased. Therefore, it is preferable that the metal deposition layer 70 be formed within the range of the above-mentioned thickness.

Furthermore, the metal deposition layer 70 may be a simple metal deposition layer or a multi-layered metal deposition layer.

The metal deposition layer 70 is sensed from the outside through the UV imprinting layer 50 and the transparent plastic film layer 30, such that the interior film according to the present invention can express the texture very similar to the texture of the metallic material and express the peculiar color sense of metal.

Figure 2:
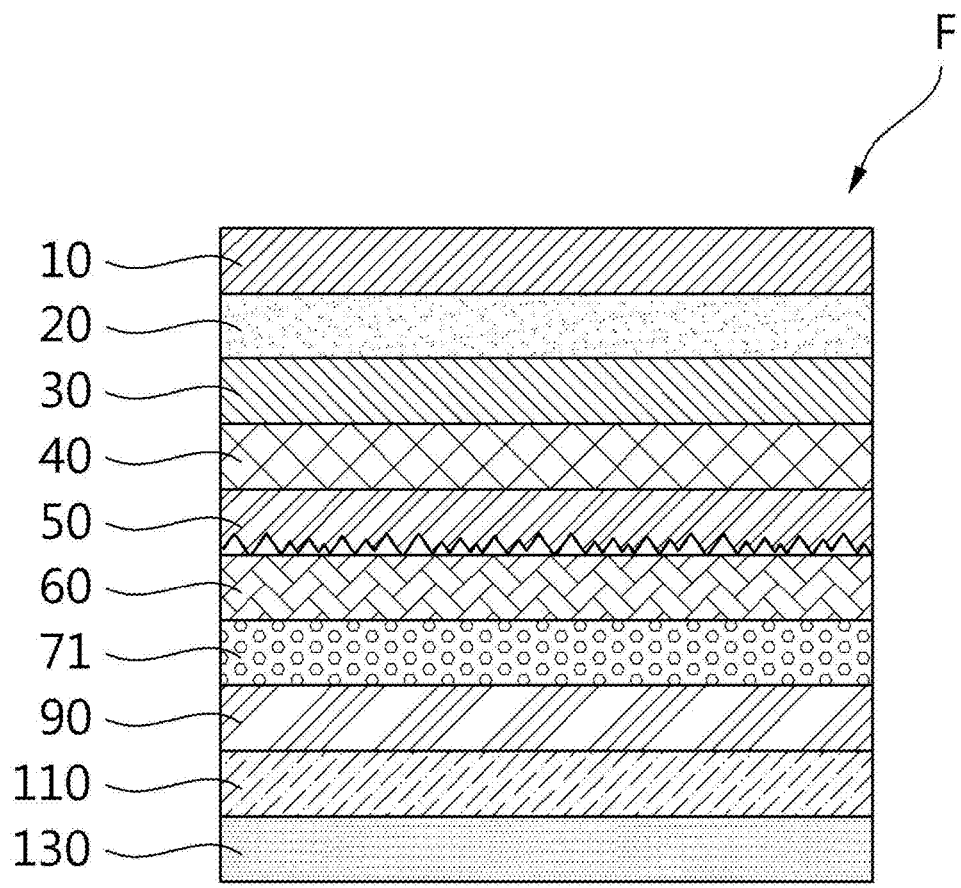
FIG. 2 is a view showing an interior film (F) having transverse hairlines formed therein according to a second preferred embodiment of the present invention.
Figure 3:
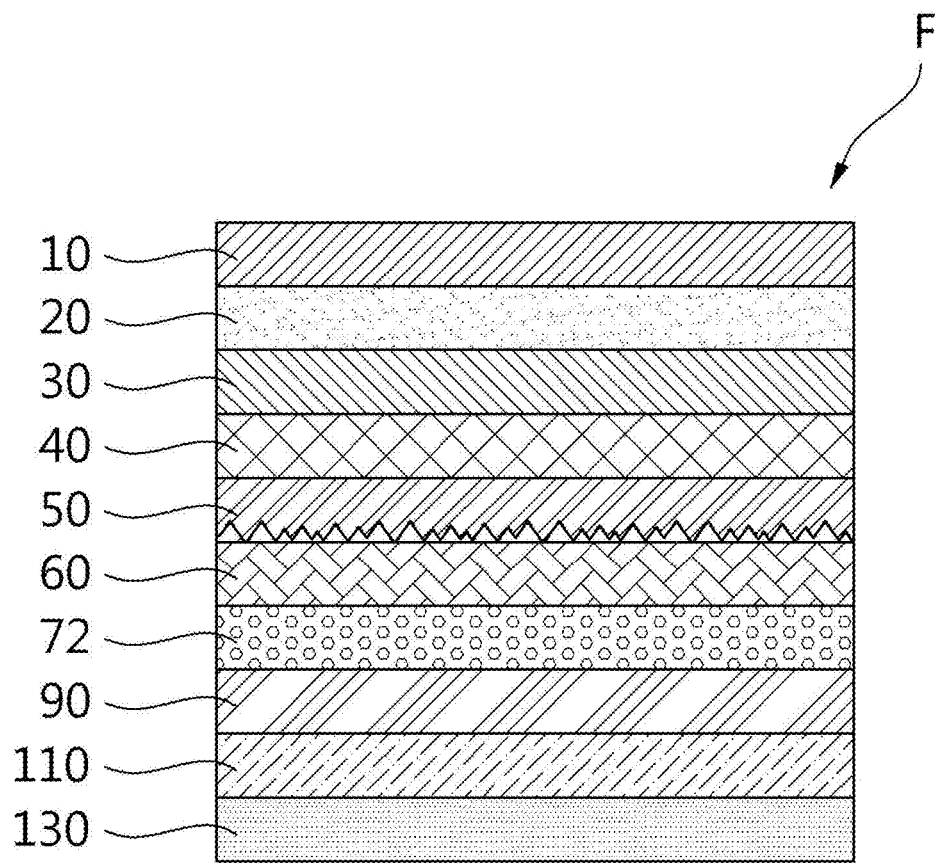
FIG. 3 is a view showing an interior film (F) having transverse hairlines formed therein according to a third preferred embodiment of the present invention.

In the meantime, the metal deposition layer 70 may be substituted with a pearl coating layer 71 or a printing layer (See FIGS. 2 and 3). The pearl coating layer 71 uses a pearl pigment and provides the same gloss effect as metal. Preferably, the pearl pigment is a calcium aluminum borosilicate-based pigment, but, the present invention is not restricted to the above.

The printing layer 72 uses pigments of various colors and is formed by various printing methods, such as gravure printing, screen printing and others to enhance availability of the interior film.

The interior film having the transverse hairlines according to the present invention further includes an adhesive layer 90 formed below the metal deposition layer 70.

The adhesive layer 90 may be formed by coating such as comma coating of polyurethane-based, polyester-based or epoxy-based adhesives, and is 1 to 20 µm in thickness, preferably 1 to 10 µm, and more preferably, 5 to 10 µm. Additionally, when the adhesive layer 90 is an opaque layer, because it can express a clearer three-dimensional sense, it is preferable to add a pigment to the adhesive.

The interior film having the transverse hairlines according to the present invention further includes a base layer 110 formed below the adhesive layer 90.

The base layer 110 is to protect the metal deposition layer 70 and strengthen weather resistance and durability, and is one selected from a poly vinyl chloride (PVC) film, a polypropylene (PP) film, a polyethylene (PE) film, an acrylonitrile-butadiene-styrene (ABS) film, a polycarbonate (PC) film and a styrene-acrylonitrile copolymer (SAN) film and a poly methyl methacrylate (PMMA) film. The base layer 110 is preferably 30 to 300 µm in thickness.

If a colored film of the above-mentioned material is used for the base layer 110, even though the surface of an iron plate is somewhat uneven, the interior film can provide excellent appearance quality without any orange peel after lamination of the iron plate.

The interior film having the transverse hairlines according to the present invention may further include a first primer layer 20 and a surface coating layer 10 formed on the upper surface of the transparent plastic film layer 30 in order.

Moreover, the interior film having the transverse hairlines according to the present invention may further include a second primer layer 40 formed between the transparent plastic film layer 30 and the UV imprinting layer 50.

Furthermore, the interior film F having the transverse hairlines according to the present invention may further include a third primer layer 60 formed between the UV imprinting layer 50 and the metal deposition layer 70.

The surface coating layer 10 is to protect the surface of the film from the exterior environment and prevent scratches or pollution of the surface, and can be formed by UV hardening or thermal hardening after gravure coating of the ultraviolet-curable resin composition or a thermo-hardening resin composition.

The ultraviolet-curable resin composition or the thermo-hardening resin composition may be acryl-based resin, acrylic urethane-based resin, epoxy-based resin, polyurethane-based resin, polyisocyanate-based resin, polyester-based resin, acrylate-based resin, ethylene-vinyl acetate copolymer resin, polyamid-based resin, melamine-based resin, synthetic rubber-based resin, and polyvinyl alcohol-based resin, and preferably, further includes an organic filler to increase strength and supplement mechanical properties.

Preferably, the surface coating layer 10 is 1 to 30 µm in thickness. If the surface coating layer 10 is less than 1 µm in thickness, its scratch prevention effect is insignificant. If the surface coating layer 10 is more than 30 µm in thickness, it may cause an increase of manufacturing costs in comparison with the effect. Therefore, it is preferable to use the surface coating layer 10 within the above-mentioned range.

The first primer layer 20 is formed to strengthen adhesion between the transparent plastic film layer 30 and the surface coating layer 10, the second primer layer 40 is formed to strengthen adhesion between the transparent plastic film layer 30 and the UV imprinting layer 50, and the third primer layer 60 is formed to strengthen adhesion between the UV imprinting layer 50 and the metal deposition layer 70. The primer layers are made of acryl-based resin, acrylurethane-based resin or epoxy-based resin, and more preferably, aliphatic urethane acrylate. Preferably, the first primer layer 20, the second primer layer 40 or the third primer layer 60 is 1 to 10 µm in thickness.

Additionally, the interior film having the transverse hairlines formed therein according to the present invention may further include a release sheet 130 which is disposed below the base layer 110 and is coated with an adhesive. Preferably, the adhesive is a hot melt adhesive which carries out adhesion by heat and pressure.

According to the method for manufacturing the interior film having the transverse hairlines formed therein, the interior film is manufactured using the forming roller on which transverse hairlines are formed, such that the transverse hairlines which are perpendicular to the length direction of the film and which could not be formed conventionally can be formed. Hereinafter, the forming roller and a forming roller manufacturing apparatus will be described in detail.

Figure 7:
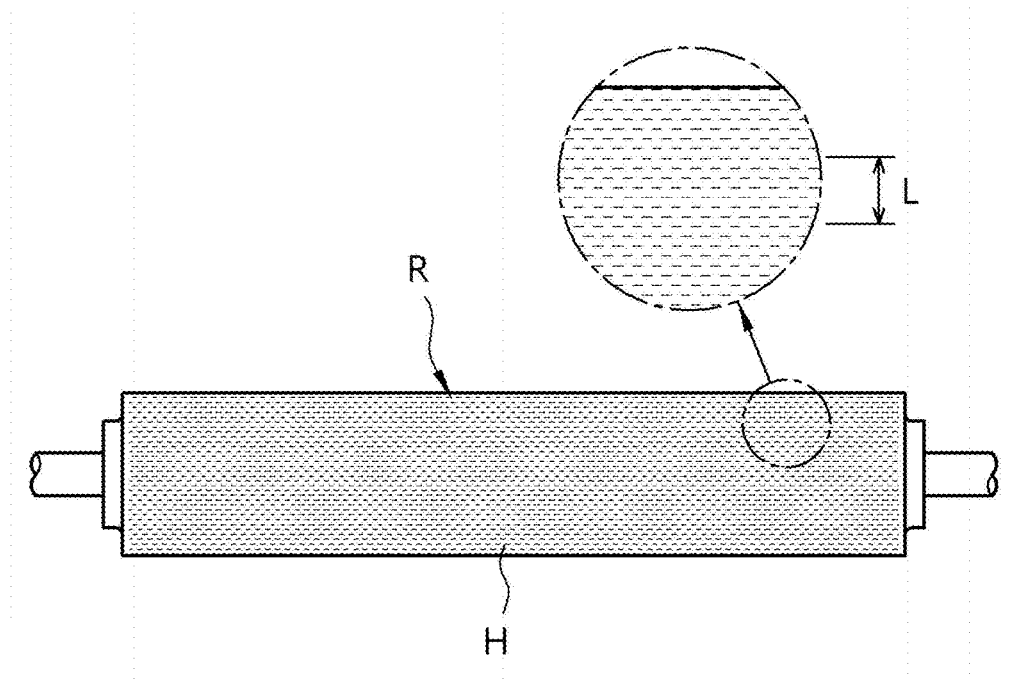
FIG. 7 is a view showing the forming roller processed by the forming roller processing apparatus 1 according to the present invention.

The forming roller used in the method for manufacturing the interior film having the transverse hairlines formed therein has transverse hairlines which are formed on the surface of the roller and which are parallel with the right and left length directions and have various lengths and roughness (See FIG. 7).

Preferably, the transverse hairline is 0.1 to 100 mm in length, 0.1 to 10 µm in average roughness (Ra) and 20 to 350 per unit length of 1 cm in the number of lines, and more preferably, 0.1 to 10 mm in length, 0.2 to 0.7 µm in average roughness (Ra) and 80 to 140 per unit length of 1 cm in the number of lines. An apparatus and a method for processing the forming roller in such a way that the forming roller has the hairlines with the above-mentioned length, average roughness and the number of lines will be described as follows.

Figure 6:
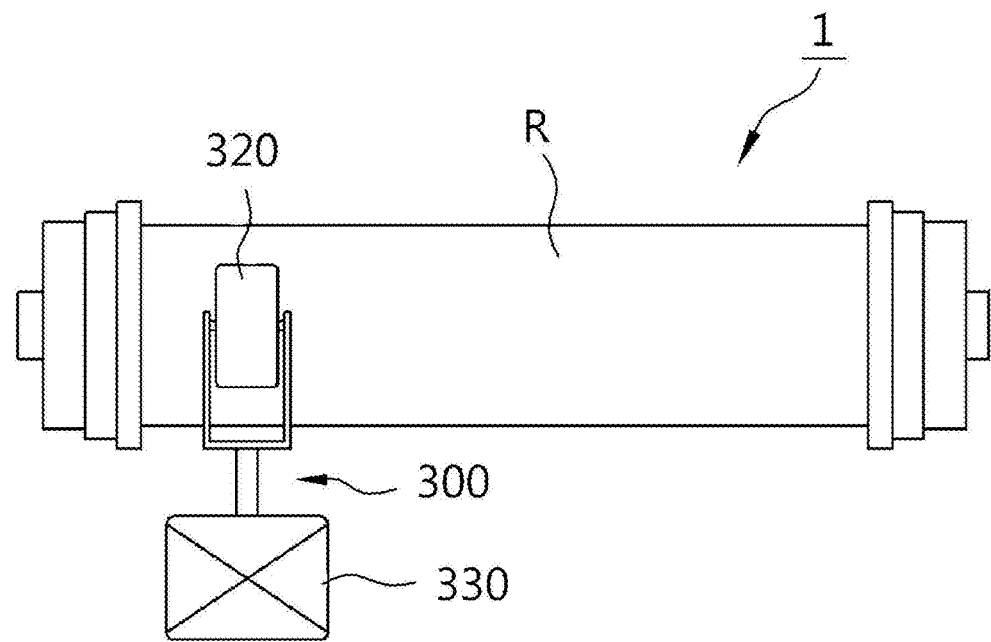
FIG. 6 is a plan view of a forming roller processing apparatus 1 according to the present invention.

A hairlines forming apparatus 1 having the forming roller R for manufacturing the interior film according to the present invention is prepared. The forming roller R has a pattern formed by a sanding roller 320 of a surface processing part 300 (See FIG. 6).

That is, a transverse hairline pattern is formed on the surface of the forming roller R, and the pattern includes fine hairlines, and the hairlines are processed transversely on the forming roller, such that hairlines are formed perpendicularly to the length direction of the film when ultraviolet-curable resin passes.

The transverse hairline pattern of the forming roller R is 0.1 to 100 mm in line length, 0.1 to 10 in average roughness Ra, and 20 to 350 per unit length (L) of 1 cm in the number of lines. Preferably, the transverse hairline patterns are randomly arranged.

The hairline forming roller R is plated with copper, chrome or nickel on the surface, such that hairline processing becomes easy.

Mirror surface finishing is carried out onto the hairline forming roller R after copper plating so as to make the surface smooth and to form accurate pattern during sanding processing which will be carried out next.

The hairline sanding is carried out by the sanding roller 320 which carries out a lateral reciprocating motion by moving means 330.

The sanding roller 320 has sandpaper wound thereon or is a grinder, and repeats pattern processing at least twice according to circumstances.

In other words, the sanding roller 320 processes the surface while moving laterally in a state where it gets in contact with one side of the forming roller R. After the sanding roller reciprocates once, the forming roller R is rotated by 0.25° to 5° to process the adjacent side.

Here, the forming roller is rotated by 0.25° to 5° in consideration of the contact area of the sanding roller to process all sides perfectly.

After the 360° perfect processing, the transverse hairline pattern is processed perfectly through several repetitions, the ultraviolet-curable resin is coated on the surface of the PET film between the processed hairline forming roller and the steel roller, and UV hardening is carried out to manufacture the interior film having the transverse hairlines formed therein.

Hereinafter, embodiments of the method for manufacturing the interior film having the transverse hairlines formed therein according to the present invention will be described. However, the present invention is not restricted to the following embodiments but is defined by the following claims.

Embodiment 1

An ultraviolet-curable resin composition is coated to 10 μm thickness on one side of a transparent plastic film layer 30 of 30 μm thickness. After that, the transparent plastic film layer 30 on which the ultraviolet-curable resin composition is coated passes between the forming roller R on which the transverse hairlines with 2 to 3 mm length, 0.5 to 0.7 μm average roughness (Ra) and 150 number of lines per unit length of 1 cm and the steel roller.

After that, the ultraviolet-curable resin composition on the transparent plastic film layer 30 is hardened by ultraviolet rays through UV irradiation so as to form an UV imprinting layer 50 on which the transverse hairlines formed on the forming roller are expressed.

After that, aluminum metal is deposited on the UV imprinting layer 50 by the general vacuum deposition so as to form an aluminum metal deposition layer 70 of 500 Å thickness.

After that, an adhesive is coated on the metal deposition layer 70 to 5 μm thickness, and then, the metal deposition layer 70 is adhered to a colored PVC film 110 of 100 μm thickness, such that the interior film F having the transverse hairlines formed therein is finished.

Embodiment 2

An ultraviolet-curable resin composition is coated to 20 μm thickness on one side of a transparent plastic film layer 30 of 30 μm thickness. After that, the transparent plastic film layer 30 on which the ultraviolet-curable resin composition is coated passes between the forming roller R on which the transverse hairlines with 5 to 8 mm length, 0.5 to 0.7 μm average roughness (Ra) and 150 number of lines per unit length of 1 cm and the steel roller. After that, the ultraviolet-curable resin composition on the transparent plastic film layer 30 is hardened by ultraviolet rays through UV irradiation so as to form an UV imprinting layer 50 on which the transverse hairlines formed on the forming roller are expressed.

After that, aluminum metal is deposited on the UV imprinting layer 50 by the general vacuum deposition so as to form an aluminum metal deposition layer 70 of 600 Å thickness.

After that, an adhesive 90 is coated on the metal deposition layer 70 to 5 μm thickness, and then, the metal deposition layer 70 is adhered to a colored PVC film 110 of 100 μm thickness.

After that, a thermo-hardening resin composition is coated on the other side of the transparent plastic film layer 30 to 30 μm thickness to form a surface coating layer 10, such that the interior film F having the transverse hairlines formed therein is finished.

Embodiment 3

An ultraviolet-curable resin composition is coated to 40 μm thickness on one side of a transparent plastic film layer 30 of 30 μm thickness. After that, the transparent plastic film layer 30 on which the ultraviolet-curable resin composition is coated passes between the forming roller R on which the transverse hairlines with 5 to 8 mm length, 0.8 to 0.9 μm average roughness (Ra) and 250 number of lines per unit length of 1 cm and the steel roller. After that, the ultraviolet-curable resin composition on the transparent plastic film layer 30 is hardened by ultraviolet rays through UV irradiation so as to form an UV imprinting layer 50 on which the transverse hairlines formed on the forming roller are expressed.

After that, a pear pigment is coated on the UV imprinting layer 50 so as to form a pearl coating layer 71.

After that, an adhesive 90 is coated on the pearl coating layer 71 to 9 μm thickness, and then, the pearl coating layer 71 is adhered to a colored PVC film 110 of 100 μm thickness.

After that, an ultraviolet-curable resin composition is coated on the other side of the transparent plastic film layer 30 to 30 μm thickness to form a surface coating layer 10, such that the interior film F having the transverse hairlines formed therein is finished.

EXPLANATION OF ESSENTIAL REFERENCE NUMERALS IN DRAWINGS

F: interior film according to the present invention
10: surface coating layer 20: first primer layer
30: transparent plastic film layer
40: second primer layer 50: UV imprinting layer
60: third primer layer 70: metal deposition layer
71: pearl coating layer 72: printing layer
90: adhesive layer 110: base layer
130: release sheet on which adhesive is coated
R: forming roller R-1: steel roller
1: forming roller processing apparatus
300: surface processing part
320: sanding roller 330: moving means

What is claimed is:

1. An interior film having transverse hairlines implemented therein comprising:
a transparent plastic film layer;
an UV imprinting layer which has transverse hairlines formed therein and is formed below the transparent plastic film layer; and
a metal deposition layer formed below the UV imprinting layer,
wherein the UV imprinting layer is formed by applying an ultraviolet-curable resin composition to one side of the transparent plastic film layer, imprinting a ultraviolet-curable resin composition applied to the transparent plastic film layer with a forming roller in which transverse hairlines are formed, and curing the ultraviolet-curable resin composition with ultraviolet rays,
wherein the transverse hairlines formed in the UV imprinting layer are formed perpendicularly to the length direction of the interior film, have various lengths and average roughness (Ra) within the ranges of the length of 0.1 to 100 mm, and the average roughness of 0.1 to 10 μm, and are 20 to 350 per unit length of 1 cm in the number of lines.

2. The interior film according to claim 1, further comprising:
an adhesive layer formed below the metal deposition layer.

3. The interior film according to claim 1, further comprising:
a base layer formed below the adhesive layer.

4. The interior film according to claim 1, wherein the transparent plastic film layer is one selected from a polyethylene terephthalate (PET) film, a polybutylene terephthalate (PBT) film, a polypropylene (PP) film, a polyethylene (PE) film, a poly vinyl chloride (PVC) film, a poly methyl methacrylate (PMMA) film, an acrylonitrile-butadiene-styrene (ABS) film, a polycarbonate (PC) film and a styrene-acrylonitrile copolymer (SAN) film.

5. The interior film according to claim 1, wherein the transparent plastic film layer is 20 to 200 μm in thickness.

6. The interior film according to claim 1, wherein the UV imprinting layer is made of ultraviolet-curable resin composition containing acrylate oligomers, monomers, photoinitiators, and additives.

7. The interior film according to claim 6, wherein the acrylate oligomer is one selected from urethane groups, epoxy groups, ester groups, ether groups and silicon groups.

8. The interior film according to claim 6, wherein the ultraviolet-curable resin composition has 30 to 100 weight % of solid.

9. The interior film according to claim 1, wherein the UV imprinting layer is 2 to 80 μm in thickness.

10. The interior film according to claim 1, wherein the transverse hairlines formed in the UV imprinting layer have various lengths and average roughness (Ra) within the ranges of the length of 0.1 to 10 mm, and the average roughness of 0.2 to 0.7 μm and are 80 to 140 per unit length of 1 cm in the number of lines.

11. The interior film according to claim 1, wherein the metal deposition layer is formed below the UV imprinting layer 50 by deposition of one selected from aluminum, chrome, zinc, copper, stainless steel, gold, silver, nickel, cobalt, iron, tin and sten.

12. The interior film according to claim 1, wherein the metal deposition layer is 100 to 1,000 Å in thickness.

13. The interior film according to claim 1, wherein the metal deposition layer is substituted with a pearl coating layer or a printing layer.

14. The interior film according to claim 13, wherein the pearl coating layer is formed by a calcium aluminum borosilicate-based pigment.

15. The interior film according to claim 2, wherein the adhesive layer is formed polyurethane-based, polyester-based or epoxy-based adhesives and is 1 to 20 μm in thickness.

16. The interior film according to claim 15, wherein the adhesive contains a pigment.

17. The interior film according to claim 3, wherein the base layer is one selected from a poly vinyl chloride (PVC) film, a polypropylene (PP) film, a polyethylene (PE) film, an acrylonitrile-butadiene-styrene (ABS) film, a polycarbonate (PC) film and a styrene-acrylonitrile copolymer (SAN) film and a poly methyl methacrylate (PMMA) film.

18. The interior film according to claim 17, wherein the film is a colored film.

19. The interior film according to claim 3, wherein the base layer is 30 to 300 μm in thickness.

20. The interior film according to claim 1, further comprising:
a first primer layer formed on the transparent plastic film layer.

21. The interior film according to claim 1, further comprising:
a second primer layer formed between the transparent plastic film layer and the UV imprinting layer.

22. The interior film according to claim 1, further comprising:
a third primer layer formed between the UV imprinting layer and the metal deposition layer.

23. The interior film according to claim 20, wherein the first primer layer, the second primer layer and the third primer layer are formed by coating acryl-based resin, acry-lurethane-based resin or epoxy-based resin.

24. The interior film according to claim 20, further comprising:
a surface coating layer formed on the first primer layer.

25. The interior film according to claim 24, wherein the surface coating layer is formed by an ultraviolet-curable resin composition or a thermo-hardening resin composition.

26. The interior film according to claim 24, wherein the surface coating layer is 1 to 30 μm in thickness.

27. The interior film according to claim 3, further comprising:
a release sheet which is disposed below the base layer and on which an adhesive is coated.

28. The interior film according to claim 27, wherein the adhesive is a hot melt type adhesive.

* * * * *